United States Patent Office 3,452,140
Patented June 24, 1969

3,452,140
COMPOSITIONS AND METHODS FOR TRANQUILIZATION WHICH EMPLOY ESTERS OF 2-LOWER ALKYL - 1,2 - DIHYDRO-QUINOLINE - N - CARBOXYLIC ACIDS
Norman L. Weinberg, Stamford, Conn., assignor, by mesne assignments, to Bristol-Myers Company, New York, N.Y., a corporation of Delaware
No Drawing. Continuation-in-part of application Ser. No. 583,076, Sept. 29, 1966. This application June 12, 1968, Ser. No. 736,275
Int. Cl. C07 33/12; A61k 27/00
U.S. Cl. 424—258      9 Claims

ABSTRACT OF THE DISCLOSURE

A method of tranquilizing mammals which comprises orally or parenterally administering esters of 2-(lower)-alkoxy or alkylthio-1,2-dihydroquinoline - N - carboxylic acids and therapeutic compositions comprising said acids and pharmaceutical carriers.

CROSS-REFERENCE TO RELATED APPLICATIONS

This application is a continuation-in-part of my prior, copending application Ser. No. 583,076 filed Sept. 29, 1966, now U.S. Patent 3,389,142, issued June 18, 1968.

This invention relates to a novel method of tranquilizing mammals. In another aspect this invention relates to novel therapeutic compositions useful for tranquilizing mammals.

According to the present invention there is provided a therapeutic composition exhibiting tranquilizing effect comprising a pharmaceutical carrier and a tranquilizing amount of a compound of the formula (1)
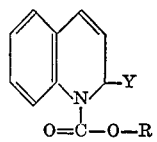
O=C—O—R wherein R represents (lower)alkyl and Y represents (lower)alkoxy or (lower)alkylthio.

The preferred compositions of the present invention contain a compound of the formula (2)
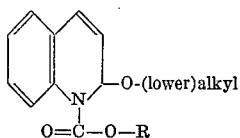
O=C—O—R wherein R is as described above.

Particularly preferred compositions of the present invention contain the methyl, ethyl or n-propyl esters of the compounds of Formula 2.

The term "(lower)alkyl" as used herein means both straight and branched chain aliphatic hydrocarbon radicals having from 1 to 6 carbon atoms usch as methyl, ethyl, propyl, isopropyl, butyl, isobutyl, t-butyl, amyl, hexyl, etc.

Similarly, where the term "(lower)" is used as part of the description of another group, e.g. (lower)alkoxy, it refers to the alkyl portion of such group which is therefore as described above in connection with (lower)alkyl.

To illustrate groups including (lower)alkyl groups, it is pointed out that (lower)alkoxy includes such radicals as methoxy, ethoxy, isopropoxy, etc.; (lower)alkylthio includes methylthio, ethylthio, butylthio, etc.

The compounds useful in the method and compositions of this invention are prepared according to the following procedures as exemplified below:

(A) Quinoline is reacted with a chloroformate, thus:

(3)
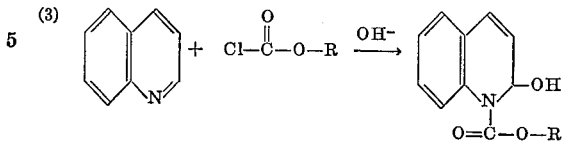

and (4)
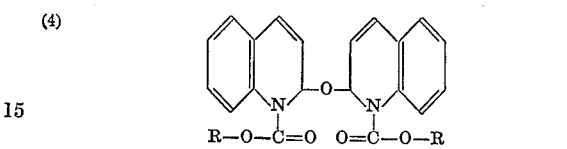

wherein R has the meaning set forth above.

The reaction is conducted using at least an equimolar weight of the chloroformate at a temperature of about 0° C. to room temperature or even up to 50° C. in the presence of a base, e.g. sodium hydroxide and potassium hydroxide and preferably in an inert solvent such as dimethylformamide.

The foregoing procedure produces a mixture of the 2-hydroxy compound and the diether which may be separated if desired.

(B) The compounds of Formula I are then prepared as exemplified below by reacting the appropriate compound of Formula 3 or Formula 4 or a mixture thereof with an alcohol or thiol of the formula (5)          H—Y wherein Y is (lower)alkoxy or (lower)alkylthio, in the presence of a Lewis acid, e.g. boron trifluoride, aluminum chloride, ferric chloride and the like.

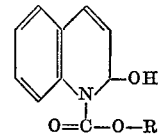

and/or

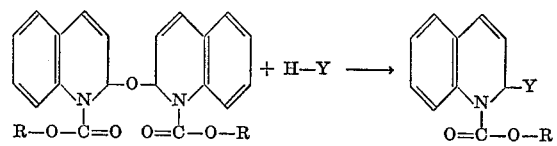

wherein Y and R have the meanings set forth above.

The reaction is conducted using an equimolar weight or slight excess of the compound of Formula 5 at a temperature of about 0° C. to room temperature or even up to 50° C., in the presence of a Lewis acid, preferably boron trifluoride, and preferably in an inert solvent such as diethyl ether.

Alternatively, the compounds of the present invention are prepared in the one-step process exemplified below by reacting quinoline with the chloroformate and a compound of Formula 5. Preferably the three reactants are mixed at a temperature of about 0° C. to 50° C. in the presence of a base and in a solvent such as dimethylformamide.

The reagents of the formula (6)          

wherein R has the meaning set out above, are prepared, for example, by reaction of phosgene with the appropriate alcohol or haloalcohol as illustrated on pp. 833, 886–899 of Chemistry of Carbon Compounds, edited by E. H. Rodd, vol. 1, part B, "Aliphatic Compounds," Elsevier Publishing Company, New York, N.Y. (1952). References to many such compounds are indexed in Chemical Abstracts as esters under "Formic acid, chloro-."

The compounds of Formula 5 are either commercially available, known in the art or can be easily prepared in accordance with standard organic procedures described in the literature.

The compositions of this invention comprise not more than about 100 mg./kg. per dosage unit, and preferably from about 1 to about 100 mg./kg., of a compound of Formula 1 together with a suitable carrier. The carrier may be either a solid or liquid and the compositions can be in the form of tablets, capsules, solutions or suspensions. The compositions can contain suitable preservatives, coloring and flavoring agents. Some examples of the carriers which can be used in the preparation of the compositions of this invention are gelatin capsules, sugars, cellulose derivatives, such as sodium carboxy methylcellulose, gelatin, talc, magnesium stearate, vegetable oil, such as peanut oil, etc., liquid petroleum, glycerin, sorbitol, ethanol, agar and water. The carrier may serve as a binder and the composition may be tabletted. If the carrier is a gelatin capsule, the compound of Formula 1 may be encapsulated into the gelatin capsule by conventional means. If a liquid carrier is used, the composition may be in the form of a suspension or solution. The composition of this invention may be administered to mammals parenterally but are preferably given orally.

The compounds of this invention when administered orally or parenterally in an effective amount, i.e. a tranquilizing amount are effective in inducing tranquility in mammals. A preferred dosage range is from about 1 to about 100 mg./kg. of body weight.

The following examples are intended to illustrate the invention described herein without unduly restricting it.

EXAMPLE 1

Preparation of 2-hydroxy-N-carbethoxy-1,2-dihydroquinoline and di-(N-carbethoxy-1,2-dihydro-2-quinolyl)ether

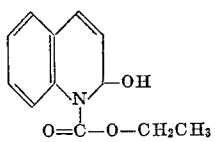

and

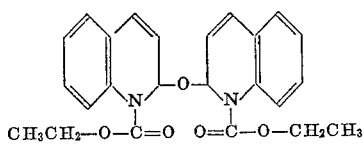

A cold (15° C.) solution of 220 g. (2.0 mole) of ethyl chloroformate, 260 g. (2.0 mole) of quinoline, and 600 ml. of dimethylformamide is added over 5 minutes with vigorous stirring to a mixture of 240 g. potassium hydroxide in 400 ml. of water and 1600 g. of crushed ice. After stirring a further 10 minutes, the mixture was extracted with 1 liter of methylene chloride and the organic extract washed with water, dried over anhydrous magnesium sulfate, filtered and evaporated leaving 400 g. of pale brown liquid containing 2 - hydroxy-N-carbethoxy - 1,2-dihydroquinoline and di - (N-carbethoxy-1,2-dihydro-2-quinolyl)ether and quinoline (product A). Concentration of 200 g. of this oil is carried out by distillation at a bath temperature of not greater than 100° C. to remove unreacted quinoline (B.P. 60–80° C., 0.1 mm.). A viscous residue weiging 125 g. containing 2-hydroxy - N - carbethoxy - 1,2 - dihydroquinoline and di - (N - carbethoxy-1,2 - dihydro - 2 - quinolyl)ether remained in the pot (product B).

EXAMPLE 2

Preparation of di-(N-carbethoxy-1,2-dihydro-2-quinolyl) ether

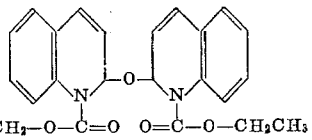

A mixture of 25 g. of product B of Example 1 in 50 ml. of cyclohexane kept at 5° C. for 72 hours deposited 4 g. of colorless solid, M.P. 139–141° C. Recrystallization from cyclohexane gave di - (N-carbethoxy-1,2-dihydro-2-quinolyl)ether, M.P. 141.5–143° C. (decomposing at 165° C.). The infrared spectrum had a strong band at 1705 (carbamate), and a weak band at 1650 cm.$^{-1}$ (c=c).

*Analysis.*—Calcd. for $C_{24}H_{24}N_2O_5$: C, 68.56; H, 5.75; N, 6.66. Found: C, 68.53; H, 5.77; N, 6.83.

EXAMPLE 3

Preparation of N-carbethoxy-2-ethoxy-1,2-dihydroquinoline

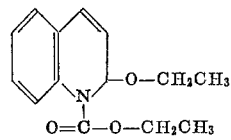

A solution consisting of 120 g. of product B of Example 1, 100 ml. of absolute ethanol, 500 ml. of anhydrous diethyl ether, and 10 drops of boron trifluoride etherate is stirred at 20° C. for 5 hours. The ethereal solution is washed with saturated sodium bicarbonate and water, dried over anydrous magnesium sulfate, filtered, and concentrated, leaving an oil. The oil is distilled, yielding 47 g. of colorless product, N-carbethoxy-2-ethoxy-1,2-dihydroquinoline, B.P. 125–128° C., 0.1 mm. On standing, the material solidified, M.P. 56–57° C.

The tranquilizing activity of this compound was indicated by its ability, at a dose as low as 50 mgm./kg. p.o. in rats, to block a conditioned response in the usual test, in which the rats are trained to climb a pole when a buzzer is sounded in order to avoid a subsequent electric shock to their feet if they remain on the floor of the cage. $ED_{50}$=3 mg./kg.

*Analysis.*—Calcd. for $C_{14}H_{17}NO_3$: C, 67.99; H, 6.93; N, 5.66. Found: C, 67.91; H, 6.94; N, 5.66.

EXAMPLE 4

Additional preparation of N-carbethoxy-2-ethoxy-1,2-dihydroquinoline

A mixture consisting of 2.69 g. (0.00638 mole) of di-(N-carbethoxy-1,2-dihydro-2-quinolyl)ether, 2 ml. of absolute ethanol, 50 ml. of diethyl ether and 1 drop of boron trifluoride etherate is stirred at 20° C. for 3 hours. The reaction mixture is poured into 10 ml. of saturated sodium bicarbonate solution and 100 ml. of water is added. The organic layer is separated, dried over anyhdrous magnesium sulfate, filtered and evaporated leaving 3.02 g of product. The infrared and NMR spectra of this oil are identical to the product of Example 3.

EXAMPLE 5

Preparation of N-carbethoxy-2-butylthio-1,2-dihydroquinoline

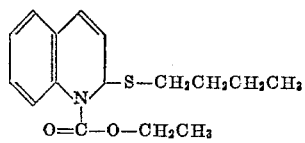

A solution of 50 g. of product A of Example 1, 30 ml. of 1-butanethiol, 200 ml. of diethyl ether, and 5 drops of boron trifluoride etherate is stirred at 20° C. for 4 hours. The ethereal solution is washed with saturated sodium bicarbonate and water, dried over anhydrous magnesium sulfate, filtered and concentrated leaving an oil. The oil is distilled yielding 31 g. of product, N-carbethoxy-2-butylthio - 1,2 - dihydroquinoline, B.P. 140° C. (0.05 mm.).

*Analysis.*—Calcd. for $C_{16}H_{21}NO_2S$: C, 65.95; H, 7.27; N, 4.81. Found: C, 65.92; H, 7.63; N, 5.47.

Minimal effective dose in rats in test of Example 3 was 50 mg./kg.

EXAMPLE 6

Direct preparation of
N-carbethoxy-2-methoxy-1,2-dihydroquinoline

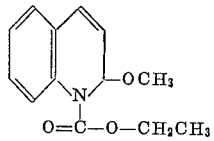

To a cold (5° C.) magnetically stirred slurry of 21.6 g. (0.40 mole) of sodium methoxide in 200 ml. of dimethylformamide is added a solution of 21.6 g. (0.20 mole) of ethyl chloroformate, 25.8 g. (0.20 mole) of quinoline, and 200 ml. of dimethylformamide dropwise over one-half hour. The mixture is slowly allowed to reach room temperature over 5 hours.

The mixture is filtered through "Celite" into 1 liter of water and extracted with 200 ml. of diethyl ether. The organic extract is washed with water, dried over magnesium sulfate, filtered and evaporated leaving an oil which on distillation provided 9 g. (19%) of product, N-carbethoxy - 2 - methoxy - 1,2 - dihydroquinoline, B.P. 130° C., 0.2 mm.

Minimal effective dose in rats in test of Example 3 was 50 mg./kg.

EXAMPLE 7

Preparation of
2-methoxy-N-carbethoxy-1,2-dihydroquinoline

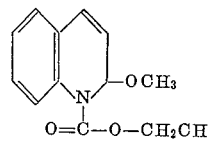

A solution consisting of 28 g. of product A of Example 1, 25 ml. methanol, 100 ml. dry diethyl ether and 5 drops of boron trifluoride is stirred at 25° C. for 15 hours. After neutralization with saturated sodium bicarbonate solution (50 ml.), the ether layer is separated and dried over anhydrous magnesium sulfate. This is filtered and concentrated leaving an oil. The oil is first distilled at 100° C., 0.2 mm. to remove impurities and then distilled to give 3.5 g. of 2-methoxy-N-carbethoxy-1,2-dihydroquinoline, B.P. 110–115° C./0.1 mm.

*Analysis.*—Calcd. for $C_{13}H_{15}NO_3$: C, 66.93; H, 6.48; N, 6.01. Found: C, 67.13; H, 6.44; N, 6.15.

EXAMPLE 8

Additional preparation of 2-butylthio-N-carbethoxy-1,2-dihydroquinoline

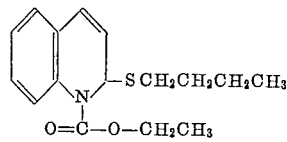

A solution consisting of 20 g. of product A of Example 1, 20 ml. of 1-butanethiol, 100 ml. of dry diethyl ether and 5 drops of boron trifluoride etherate is stirred for 2 hours at 25° C. The reaction mixture is poured into 100 ml. of saturated sodium bicarbonate, the ether layer extracted, re-washed with 100 ml. of water and dried over magnesium sulfate. This is filtered and concentrated leaving a viscous oil. The oil is distilled first to remove the low boiling impurities and then the residual oil is distilled to give 10.0 g. of 2-butylthio-N-carbethoxy-1,2-dihydroquinoline, B.P. 140° C./0.05 mm.

*Analysis.*—Calcd. for $C_{16}H_{21}NO_2S$: C, 65.95; H, 7.27; N, 4.81. Found: C, 65.95; H, 7.63; N, 5.47.

EXAMPLE 9

Preparation of
2-ethylthio-N-carbethoxy-1,2-dihydroquinoline

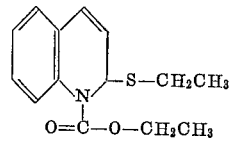

A solution consisting of 20 g. of product A of Example 1, 20 ml. ethane thiol, 150 ml. dry diethyl ether, and 5 drops of boron trifluoride etherate is stirred for 2 hours at 25° C. The reaction mixture is extracted with 2×100 ml. of saturated sodium bicarbonate solution and the ether layer separated, dried over magnesium sulfate, filtered and concentrated leaving an oil. The oil is distilled first to remove the low boiling impurities and then the residual oil is distilled at a bath temperature of 160–170° C. to give 15 g. of 2-ethylthio-N-carbethoxy-1,2-dihydroquinoline, B.P. 133° C./0.05 mm.

*Analysis.*—Calcd. for $C_{14}H_{17}NO_2S$: C, 63.86; H, 6.51; N, 5.32. Found: C, 63.70; H, 6.58; N, 6.07.

Minimal effective dose in rats in test of Example 3 was 50 mg./kg.

EXAMPLE 10

Preparation of
2-isopropoxy-N-carbethoxy-1,2-dihydroquinoline

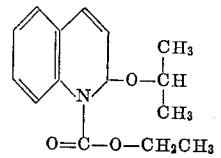

A solution of Product A of Example 1, 25 ml. of isopropanol, 100 ml. of diethyl ether, and 5 drops of boron trifluoride etherate is stirred for 24 hours at 25–35° C. The solution is neutralized with saturated sodium bicarbonate, diluted with 500 ml. of water and extracted 2× 100 ml. of diethyl ether. The combined extract is dried over magnesium sulfate, filtered and concentrated leaving 30 g. of an oil. The oil is distilled to give 6 g. of 2-isopropoxy-N-carbethoxy-1,2-dihydroquinoline, B.P. 117° C./0.05 mm.

*Analysis.*—Calcd. for $C_{15}H_{19}NO_3$: C, 68.94; H, 7.33; N, 5.36. Found: C, 69.02; H, 7.22; N, 5.85.

Minimal effective dose in rats in test of Example 3 was 50 mg./kg.

EXAMPLE 11

Preparation of
2-t-butoxy-N-carbethoxy-1,2-dihydroquinoline

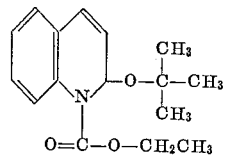

A solution consisting of 59 g. of product A of Example 1, 50 ml. of pure t-butyl alcohol, 100 ml. of diethyl ether and 5 drops of boron trifluoride etherate is stirred for 2 hours at 25° C. After neutralization with saturated sodium bicarbonate solution (50 ml.), the ether layer is separated and dried over anhydrous magnesium sulfate. This is filtered and concentrated leaving an oil.

The oil is first distilled at 100° C., 0.2 mm. to remove low boiling impurities and then the residual oil distilled at a bath temperature of 165° C. to give 2.4 g. of 2-t-butoxy - N - carbethoxy - 1,2 - dihydroquinoline, B.P. 125° C./0.1 mm.

*Analysis.*—Calcd. for $C_{16}H_{21}NO_3$: C, 69.79; H, 7.69; N, 5.09. Found: C, 68.95; H, 7.04.

Minimal effective dose in rats in test of Example 3 was 50 mg./kg.

EXAMPLE 12

Use in the procedure of Example 1 in place of the ethyl chloroformate of an equimolar weight of isobutyl chloroformate, isopropyl chloroformate, and t-buty chloroformate, respectively, produces isobutyl 2-hydroxy-1,2-dihydroquinoline-N-carboxylate and
di(N-isobutoxycarbonyl-1,2-dihydro-2-quinolyl)ether,
isopropyl 2-hydroxyl-1,2-dihydroquinoline-N-carboxylate and
di(N-isopropoxycarbonyl-1,2-dihydro-2-quinolyl) ether,
t-butyl 2-hydroxy-1,2-dihydroquinoline-N-carboxylate and
di(N-t-butoxycarbonyl-1,2-dihydro-2-quinolyl)ether, respectively.

EXAMPLE 13

Use in the procedure of Example 3 in place of the mixture of 2-hydroxy-N-carbethoxy-1,2-dihydroquinoline and
di(N-carbethoxy-1,2-dihydro-2-quinolyl)ether of each of the products of Example 12 produces,
isobutyl 2-ethoxy-1,2-dihydroquinoline-N-carboxylate,
isopropyl 2-ethoxy-1,2-dihydroquinoline-N-carboxylate, and
t-butyl 2-ethoxy-1,2-dihydroquinoline-N-carboxylate, respectively.

EXAMPLE 14

Use in the procedure of Example 3 in place of ethanol of an equimolar weight of methyl thiol produces N-carbethoxy-2-methylthio-1,2-dihydroquinoline.

EXAMPLE 15

N - carbethoxy - 2-ethoxy-1,2-dihydroquinoline is encapsulated into hard gelatin capsule in an amount of 250 mg. per capsule. One or more capsules may be administered orally, depending upon the weight of the animal.

EXAMPLE 16

An aqueous suspension of N - carbethoxy - 2 - ethoxy-1,2 - dihydroquinoline is administered orally to rats in a dose of 50 mg. of N-carbethoxy-2-ethoxy-1,2-dihydroquinoline per kg. of body weight. Tranquility is thereby induced.

While the foregoing invention has been described and exemplified in terms of its preferred embodiment, those skilled in the art will appreciate that modifications can be made without departing from the spirit and scope of the present invention.

I claim:
1. A therapeutic composition exhibiting a tranquilizing effect comprising a pharmaceutical carrier and a tranquilizing amount of a compound of the formula

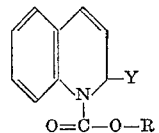

wherein R is (lower)alkyl and Y is (lower)alkoxy or (lower)alkylthio.

2. The composition of claim 1 wherein said compound is N-carbethoxy-2-ethoxy-1,2-dihydroquinoline.
3. A tablet or capsule containing the composition of claim 1.
4. The composition of claim 1 wherein said tranquilizing amount is from about 1 to about 100 mg./kg. of body weight per dosage unit.
5. The composition of claim 1 wherein said tranquilizing amount is from about 1 to about 100 mg./kg. of body weight per dosage unit and said compound is N-carbethoxy-2-ethoxy-1,2-dihydroquinoline.
6. A method of inducing tranquility in mammals which comprises orally or parenterally administering a tranquilizing amount of a compound of the formula

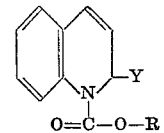

wherein R is (lower)alkyl and Y is (lower)alkoxy or (lower)alkylthio, to said mammal.

7. The method of claim 6 wherein said compound is N-carbethoxy-2-ethoxy-1,2-dihydroquinoline.
8. The method of claim 6 wherein said compound is administered in a dose of from about 1 to about 100 mg./kg. of body weight.
9. The method of claim 6 wherein said compound is N - carbethoxy - 2 - ethoxy - 1,2 - dihydroquinoline and is administered in a dose of from about 1 to about 100 mg./kg. of body weight.

References Cited
UNITED STATES PATENTS 2,623,046  12/1952  Cusic _____ 260—247.2
2,650,919  9/1953   Cusic _____ 260—243

ALBERT T. MEYERS, *Primary Examiner.*

S. J. FRIEDMAN, *Assistant Examiner.*